(12) United States Patent
Nagatani et al.

(10) Patent No.: US 6,334,428 B1
(45) Date of Patent: Jan. 1, 2002

(54) FUEL INJECTION TIMING CONTROL SYSTEM FOR INTERNAL COMBUSTION ENGINE

(75) Inventors: Shuji Nagatani; Masahiro Sato; Minoru Torii, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/552,263

(22) Filed: Apr. 19, 2000

(30) Foreign Application Priority Data

Apr. 20, 1999 (JP) .......................................... 11-111932

(51) Int. Cl.$^7$ ................................................. F02B 5/02
(52) U.S. Cl. .......................... 123/305; 701/105; 123/490
(58) Field of Search ................................. 701/104, 105; 123/305, 478, 490

(56) References Cited

U.S. PATENT DOCUMENTS 5,832,901 A * 11/1998 Yoshida et al. ............. 123/478
5,878,713 A * 3/1999 Kadota ....................... 123/305
5,960,765 A * 10/1999 Iida et al. ................... 123/305
6,058,907 A * 5/2000 Motose et al. .............. 123/305

FOREIGN PATENT DOCUMENTS

JP 4-37264 6/1992

* cited by examiner

*Primary Examiner*—Erick Solis
(74) *Attorney, Agent, or Firm*—Arent Fox Kintner Plotkin & Kahn (57) ABSTRACT

A fuel injection timing control system for a direct injection spark ignition internal combustion engine which is operated at an ultra-lean burn combustion or at a pre-mixture charged combustion. In the system, a fuel injection start timing limit by which injection of the determined fuel injection amount should be started and a fuel injection end timing limit by which injection of the determined fuel injection amount should be ended are determined based at least on the detected engine speed in accordance with predetermined data so as to avoid smoke from occurring in the engine, and when a determined fuel injection amount can not be injected within a time of period defined by the limits, a desired fuel injection start or end timing or the determined fuel injection amount is corrected, thereby ensuring the engine torque drop to a minimum extent, while surely avoiding smoke to occur.

26 Claims, 4 Drawing Sheets

FUEL INJECTION TIMING CONTROL SYSTEM FOR INTERNAL COMBUSTION ENGINE

BACKGROUND OF THE INVENTION

1. Field of the Invention

This invention relates to a fuel injection timing control system for an internal combustion engine, more particularly to a fuel injection timing control system for a direct injection spark ignition engine, in which gasoline fuel is directly injected into the combustion chamber of the engine.

2. Description of the Related Art

A direct injection spark ignition engine has recently been proposed in which gasoline fuel is directly injected into the combustion chamber such that an ultra-lean burn combustion or a stratified combustion (in an ultra lean air/fuel ratio) or the pre-mixture charged combustion (in a uniform air/fuel ratio) occurs in the engine as is disclosed in, for example, Japanese Patent Publication No. Hei 4 (1992)-37264.

In the direct injection spark ignition engine, gasoline fuel injected at a timing or point insufficient for the gasoline fuel to vaporize may sometimes produce smoke. However, if fuel injection is merely exhibited in areas where smoke may occur, the engine torque will drop. This sometimes makes it difficult to achieve the desired engine torque. Here, "smoke" indicates black soot made from unburned HC caused by oxygen poverty.

SUMMARY OF THE INVENTION

An object of the present invention is therefore to provide a fuel injection timing control system for an internal combustion engine, more particularly for a direct injection spark ignition engine which can ensure the engine torque drop is kept to a minimum extent, while avoiding smoke to occur.

This invention achieves this object by providing a system for controlling a fuel injection timing for a direct injection spark ignition internal combustion engine which is operated at an ultra-lean burn combustion or at a pre-mixture charged combustion, comprising; engine operating condition detecting means for detecting operating conditions of the engine at least including an engine speed and an engine load; fuel injection amount determining means for determining a fuel injection amount based at least on the detected engine speed and the engine load of the engine operating conditions; desired fuel injection start timing determining means for determining a desired fuel\injection start timing at which injection of the determined fuel injection amount should be started based at least on the detected engine speed and the engine load; fuel injection start timing limit determining means for determining a fuel injection start timing limit by which injection of the determined fuel injection amount should be started based at least on the detected engine speed in accordance with predetermined data so as to avoid smoke from occurring in the engine; fuel injection timing comparing means for comparing the desired fuel injection start timing with the fuel injection start timing limit; fuel injection start timing correcting means for correcting at least one of the desired fuel injection start timing and the fuel injection amount, when the desired fuel injection start timing is found to exceed the fuel injection start timing limit in an advanced direction in crank angle, such that the fuel injection is started by the fuel injection timing limit. and fuel injecting means for injecting the determined fuel injection amount based on the determined fuel injection start timing.

BRIEF EXPLANATION OF THE DRAWINGS

This and other objects and advantages of the invention will be more apparent from the following description and drawings, in which.

DETAILED DESCRIPTION OF THE PREFERRED EMBODIMENT

Embodiments of the present invention will now be explained with reference to the drawings.

Figure 1:
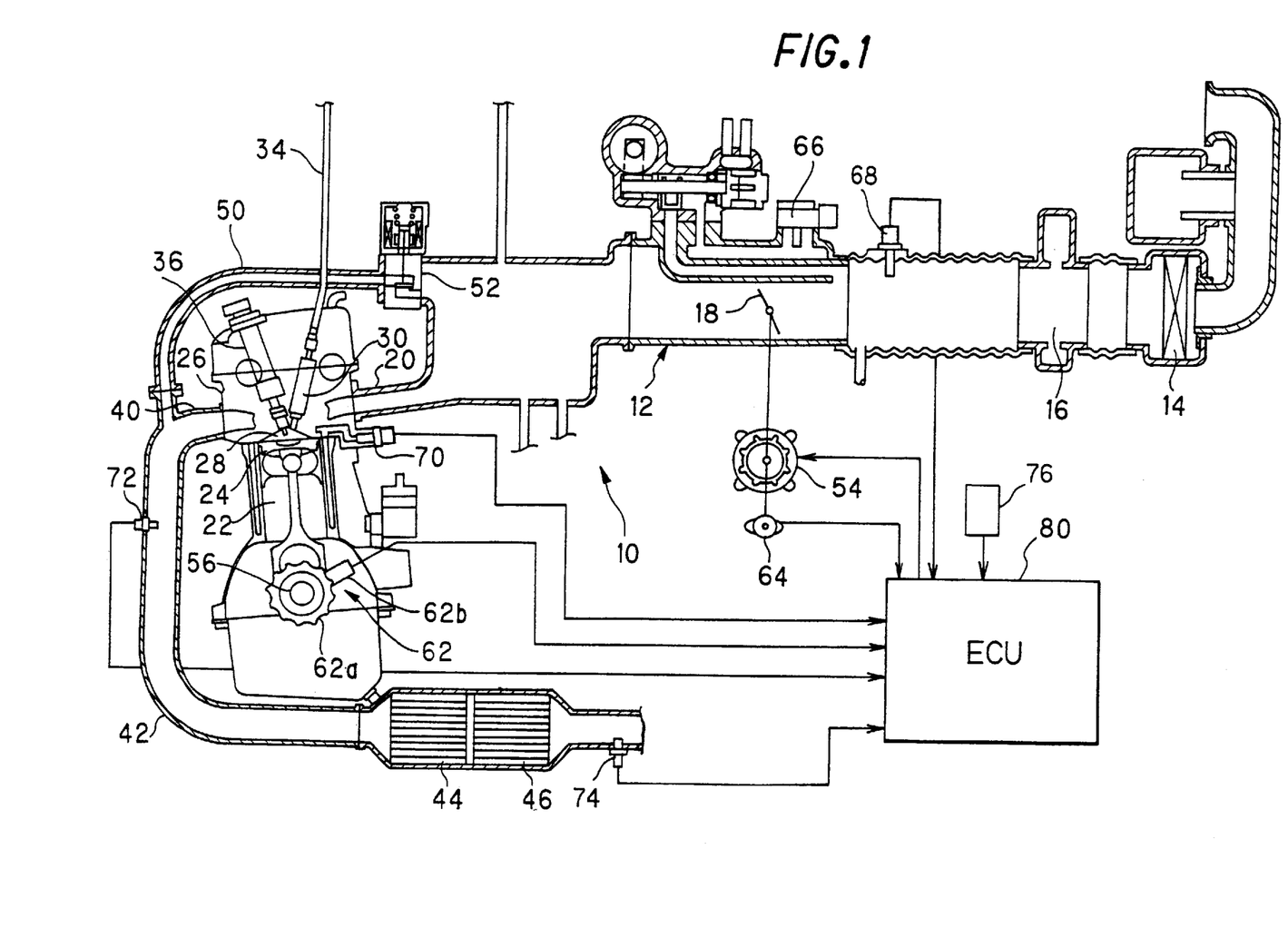
FIG. 1 is an overall schematic view showing a fuel injection timing control system for an internal combustion engine according to an embodiment of the invention.

FIG. 1 is an overall schematic view of a fuel injection timing control system for an internal combustion engine according to an embodiment of the invention.

Reference numeral 10 in this figure designates an OHC in-line four-cylinder internal combustion engine. Air drawn into an air intake pipe 12 through an air cleaner 14 mounted on its far end flows through a surge tank 16 and an intake manifold 20, while the flow thereof is adjusted by a throttle valve 18, to two intake valves (neither shown) of respective one of the first to fourth cylinders 22 (for brevity of illustration, only one is shown in the figure).

Each cylinder 22 has a piston 24 which is displaceable in the cylinder 22. The top of the piston 24 is recessed such that a combustion chamber 28 is formed in a space defined by the recessed cylinder top and the inner wall of a cylinder head (and the inner wall of the cylinder 22 ). A fuel injector 30 is provided in the vicinity of the center of the ceiling of the combustion chamber 28. The fuel injector 30 is connected to a fuel supply pipe 34 and is supplied with pressurized fuel (gasoline) from a fuel tank (not shown) pumped by a pump (not shown) and injects fuel directly into the combustion chamber 28 when opened. The injected fuel mixes with the air and forms the air-fuel mixture.

A spark plug 36 is provided in the vicinity of the fuel injector 30 which is supplied with electric energy from an ignition system including an ignition coil (neither shown) and ignites the air-fuel mixture at a predetermined ignition timing in the order of the first, the third, the fourth and the second cylinder. The resulting combustion of the air-fuel mixture drives down the piston 24.

Thus, the engine 10 is a direct injection spark ignition engine in which the gasoline fuel is directly injected into the combustion chamber 28 of respective cylinders 22 through the fuel injector 30.

The exhaust gas produced by the combustion is discharged through two exhaust valves (neither shown) into an exhaust manifold 40, from where it passes through an exhaust pipe 42 to a catalytic converter 44 (for removing NOx in the exhaust gas) and a second catalytic converter 46 (three-way catalyst for removing NOx, CO and HC in the exhaust gas) to be purified and then flows out of the engine 10.

The exhaust pipe 42 is connected, at a location downstream of the confluence point of the exhaust manifold 40, to the air intake pipe 12 by an EGR conduit 50 so as to recirculate the exhaust gas partially in the operation of EGR (Exhaust Gas Recirculation). An EGR control valve 52 is provided at the EGR conduit 50 to regulate the amount of EGR.

The throttle valve 18 is not mechanically linked with an accelerator pedal (not shown) installed at the floor of a vehicle operator seat (not shown), but is connected to a stepper motor 54 to be driven by the motor to open/close the air intake pipe 12. The throttle valve 18 is operated in such a DBW (Drive-By-Wire) fashion.

The piston 24 is connected to a crankshaft 56 to rotate the same. A crank angle sensor 62 is installed in the vicinity of the crankshaft 56, which comprises a pulser 62a fixed to the rotating crankshaft 56 and an electromagnetic pickup 62b fixed in an opposing stationery position. The crank angle sensor 62 generates a cylinder discrimination signal (named "CYL") once every 720 crank angular degrees, a signal (named "TDC" (Top Dead Center)) at a predetermined BTDC crank angular position and a unit signal (named "CRK") at 30 crank angular degrees obtained by dividing the TDC signal intervals by six.

A throttle position sensor 64 is connected to the stepper motor 54 and generates a signal indicative of the opening degree of the throttle valve 18 (named "TH"). A manifold absolute pressure (MAP) sensor 66 is provided in the air intake pipe 12 downstream of the throttle valve 18 and generates a signal indicative of the engine load, more precisely the absolute manifold pressure (named "PBA") generated by the intake air flow there through a conduit (not shown).

An intake air temperature sensor 68 is provided at a location upstream of the throttle valve 18 (close to the air cleaner 14) and generates a signal indicative of the temperature of intake air (named "TA"). And a coolant temperature sensor 70 is installed in the vicinity of the cylinder 22 and generates a signal indicative of the temperature of an engine coolant (named "TW").

Further, a universal (or wide range) sensor (air-fuel ratio sensor) 72 is installed at the exhaust pipe 42 at a position upstream of the catalytic converters 44, 46 and generates a signal indicative of the exhaust air/fuel ratio that changes linearly in proportion to the oxygen concentration in the exhaust gas. This sensor 72 is hereinafter referred to as "LAF" sensor. In addition, an $O_2$ sensor (air-fuel ratio sensor) 74 is provided at a position downstream of the catalytic converters 44, 46 and generates a signal which changes each time the exhaust air/fuel turns from lean to rich and vice versa with respect to a stoichiometric air/fuel ratio.

Furthermore, an accelerator position sensor 76 is provided in the vicinity of the accelerator pedal which generates a signal indicative of the position (opening degree) of the accelerator pedal (named "θAP").

The outputs of the sensors are sent to an ECU (Electronic Control Unit) 80. The ECU 80 comprises a microcomputer having a CPU, a ROM, a RAM (all not shown), etc. The CRK signal generated by the crank angle sensor 62 is counted by a counter (not shown) in the ECU 80 and the engine speed NE is detected or calculated.

In the ECU 80, the CPU determines or calculates the fuel injection amount and ignition timing based on the detected parameters obtained by the sensors and including the detected engine speed NE. Explaining the determination of the fuel injection amount more specifically, the CPU determines a desired torque (named "PME") to be generated by the engine 10 based on the detected engine speed NE and the detected accelerator position θ AP. The CPU then determines or calculates a desired air/fuel ratio KCMD to be supplied to the engine 10 based on the determined desired torque PME and the detected engine speed NE.

Parallel with the above, the CPU determines or calculates a basic injection amount (named "TI") based on the detected engine speed NE and the manifold absolute pressure PBA. Based on the determined basic injection amount, it then determines an output injection amount (named "TOUT") as follows. The amounts TI and TOUT are determined in terms of the fuel injector opening period.

$$TOUT=TI \times KCMDM \times KEGR \times KLAF \times KT+TT$$

In the above, KCMDM is a desired air/fuel ratio correction coefficient and is determined by correcting the desired air/fuel ratio KCMD by the charging efficiency. The values KCMD and KCMDM are, in fact, determined in terms of the equivalence ratio. The output fuel injection amount TOUT is hereinafter referred to as "Ftoutfi".

In the above, KEGR is a correction coefficient for correcting the disturbance caused by EGR and is determined based on the desired torque PME and the engine speed NE. KLAF is a feedback correction coefficient and is determined based on the output of the LAF sensor 72. KT is the product of other correction factors in multiplication form and TT is the sum of other correction factors in additive form (and subtraction form).

As regards the desired air/fuel ratio KCMD, the CPU determines it such that the actual air/fuel ratio in the vicinity of the spark plug 36 falls within a range from 12.0:1 to 15.0:1, irrespective of the engine load, while the actual average air/fuel ratio (averaged air/fuel ratio throughout the cylinder 22) falls within a range from 12.0:1 to 15.0:1 at a high engine load, within a range exceeding thereof but up to 22.0:1 at a medium engine load, and within a range exceeding thereof but up to 60.0:1 at a low engine load. Moreover, the CPU controls to inject fuel during the intake stroke at a high or medium engine load, while controlling to inject fuel during the compression stroke at a low engine load. The injected fuel mixes with the intake air and is ignited, resulting in the ultra-lean burn combustion (DISC (Direct Injection Stratified Charged) combustion) or the pre-mixture charged combustion.

Explaining the determination of the ignition timing, the CPU determines a basic ignition time based on the detected engine speed NE and the engine load (manifold absolute pressure PBA) and by correcting the same by the detected coolant temperature TW and some similar parameters, determines an output ignition timing to be supplied to the engine 10.

The operation of the fuel injection timing control system for an internal control according to the embodiment will be explained.

Figure 2:
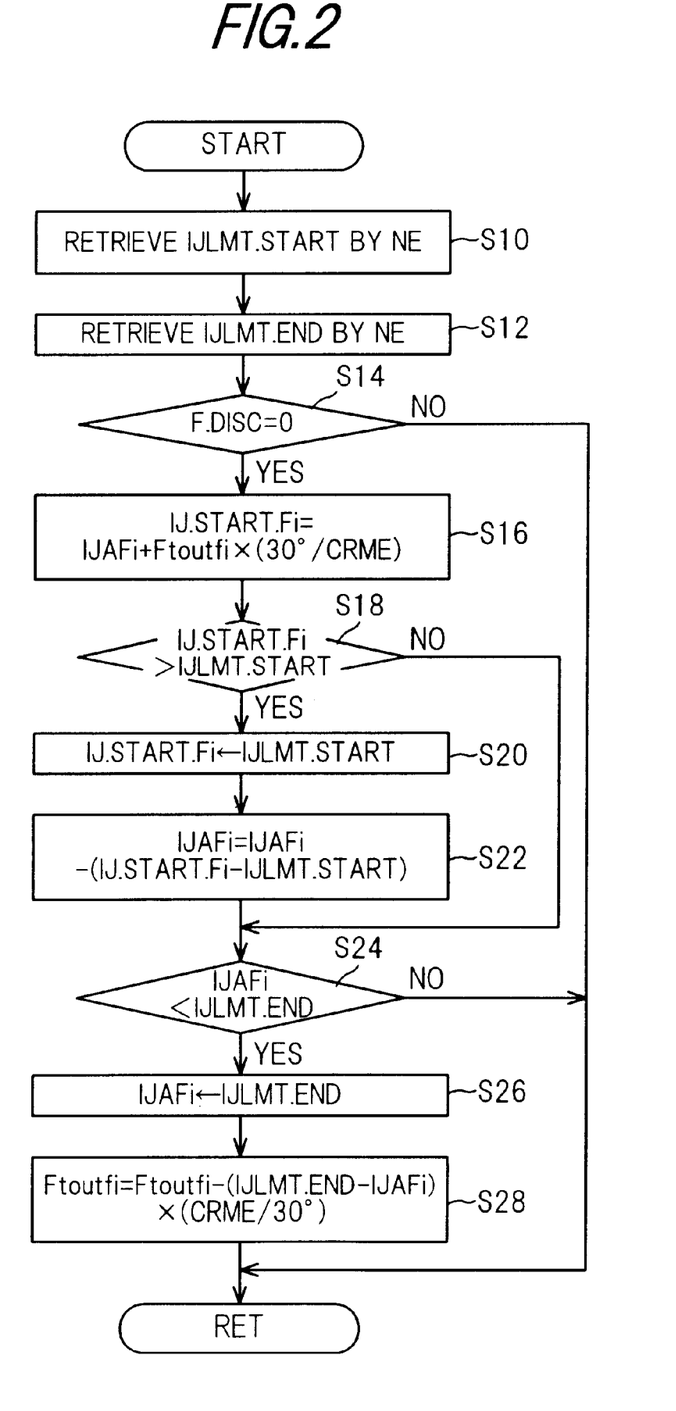
FIG. 2 is a flow chart showing the operation of the system illustrated in FIG. 1.

FIG. 2 is a flow chart showing the operation of the system. The program of this flow chart is executed at predetermined BTDC crank angular position.

The program begins in S10 in which a fuel injection start timing (point) limit (named "IJLMT.START") is retrieved from table data using the detected engine speed NE as address data, and proceeds to S12 in which a fuel injection end timing (point) limit (named "IJLMT.END") is similarly determined using the detected engine speed NE as address data.

Figure 3:
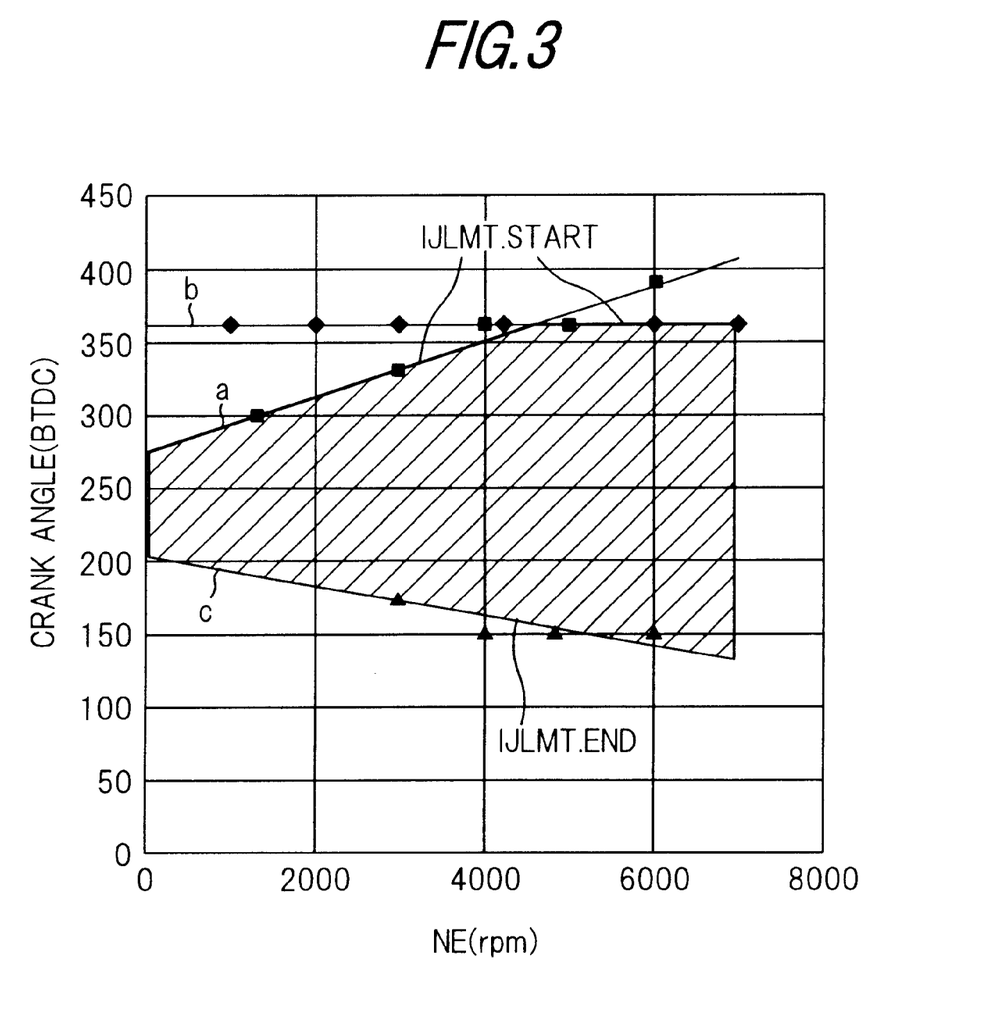
FIG. 3 is measured data showing the occurrence of smoke measured with respect to the crank angle.

Before continuing the explanation of the flow chart, the operation will be outlined with reference to FIG. 3.

The figure shows measured data of occurrences of smoke measured relative to the crank angle. In the figure, a black square symbol indicates a most advanced crank angular limit enabling to avoid the occurrence of smoke and that of a black triangle indicates a most retarded crank angular limit enabling to avoid the occurrence of smoke.

Here, "crank angular point enabling to avoid the occurrence of smoke" means crank angular limit which can completely or almost completely avoid the occurrence of smoke. In the figure, the crank angle zero point indicates the Top Dead Center at the compression stroke.

Further, in the figure, a black rhombus symbol indicates a most advanced crank angular limit enabling to avoid the increase of unburned HC (hydrocarbon) emission. More specifically, since the overlapping amount of the intake and exhaust valve opening increases as the fuel injection starting time is advanced (in the upper direction in FIG. 3), the amount of unburned HC emission will accordingly increase. The black rhombus symbol indicates a permissible limit of unburned HC emission.

More specifically, as illustrated in the figure, the characteristics of the table data of IJLMT.START and IJLMT.END have been prepared relative to the engine speed NE such that IJLMT.START is advanced with increasing NE and ILJMT.END is retarded with increasing NE. This is because the interval between crank angles in time decreases with increasing engine speed NE.

Figure 4A:
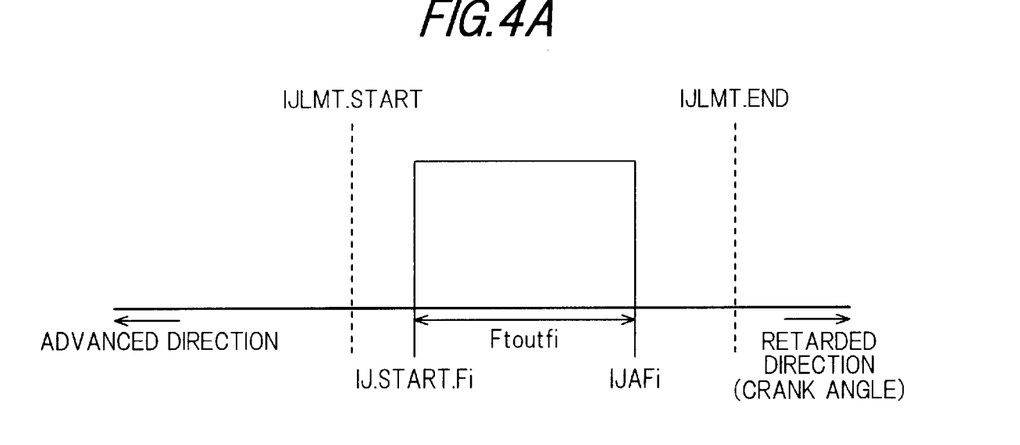
FIGS. 4A–4C are a set of time charts showing the operation illustrated in FIG. 2.

FIG. 4 is a set of time charts, in which FIG. 4A specifically illustrates the, thus determined fuel injection start timing limit IJLMT.START and the fuel injection end timing limit IJLMT.END.

Returning to the explanation of the flow chart of FIG. 2, the program proceeds to S14 in which it is determined whether the bit of a flag F.DISC is reset to 0. As mentioned above, in a routine (not shown), the bit of the flag is set to 1 when the engine 10 should be operated to produce the ultra-lean burn combustion, while it is reset to 0 when the engine 10 should be operated to produce the pre-mixture charged combustion. Specifically, it is determined here that the engine operation is in a region in which the pre-mixture charging should be made. When the result is negative, the program is immediately terminated.

This is because the cause of the occurrence of smoke is not the same in the region of pre-mixture charged combustion and in the region of ultra-lean burn combustion. The smoke occurring in the region of ultra-lean burn combustion is due to the unburned fuel particles resulting from insufficient fuel vaporization.

Different from that, the smoke occurring in the region of pre-mixture charged combustion is due to the fuel injection timing. In order to avoid the occurrence of smoke in this region, accordingly, the fuel injection timing should be delayed at a low engine speed since the pre-mixing of fuel and air is apt to be insufficient due to the intake air delay. On the other hand, the fuel injection timing should be advanced at a high engine speed since the contribution of the air flow (after the intake valves have been closed) to the air-fuel mixing, becomes less. Taking the above into account, the system is configured to avoid the occurrence of smoke which would otherwise occur in the region of pre-mixture charged combustion, by presetting the limits IJLMT.START and IJLMT.END as table data.

When the result in S14 is affirmative, the program proceeds to S16 in which a desired fuel injection start timing (or point named "IJ.START.Fi") is determined or calculated using an equation shown there.

In the equation, IJAFi indicates a desired fuel injection end timing (point) and is determined in terms of crank angle by retrieving mapped data (whose characteristics are not shown) using the detected engine speed NE and the engine load (manifold absolute pressure PBA) as address data. Ftoutfi indicates the aforesaid output injection amount and indicates a fuel injection period. CRME indicates the period (interval) between CRK signals generated at every 30 crank angular degrees Thus, the processing in S16 is to convert the fuel injection period Ftoutfi into crank angles, and to add it to the desired fuel injection end timing IJAFi so as to determine or calculate back the desired fuel injection start timing in crank angles.

The program then proceeds to S18 in which it is determined whether the determined desired fuel injection start timing IJ.START.Fi exceeds (in crank angle) the fuel injection start timing limit IJLMT.START. In the flow chart, the advanced direction is defined to be positive. Therefore, it is determined here whether IJ.START.Fi exceeds IJLMT.START in the advanced direction in crank angle.

Figure 4B:
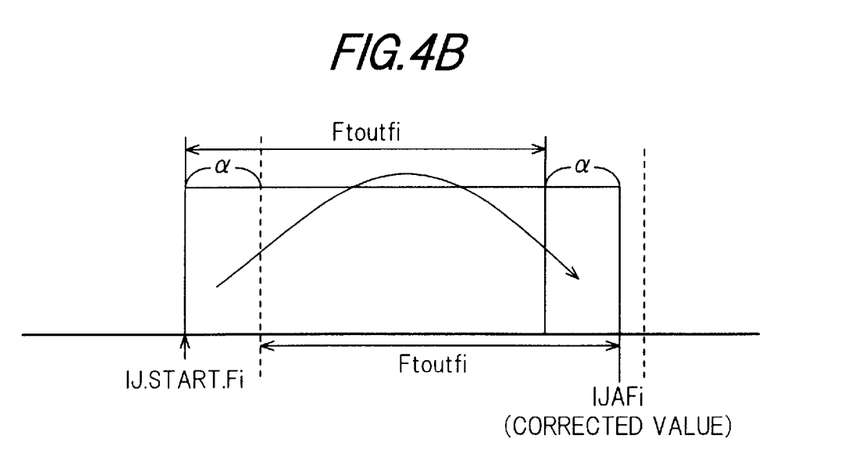

When the result in S18 is affirmative, the program proceeds to S20 in which the desired fuel injection start timing IJ.START.Fi is set to the fuel injection start timing limit IJLMT.START. Specifically, as illustrated in FIG. 4B, if IJ.START.Fi exceeds IJLMT.START by a in the advanced direction in crank angle, for example, IJ.START.Fi is limited to IJLMT.START.

In the flow chart of FIG. 2, the program then proceeds to S22 in which the desired fuel injection end timing IJAFi is corrected in the manner shown there. Explaining this taking the case shown in FIG. 4B again as an example, the procedure indicates to correct IJAFi in the retarded direction by the excess amount $\alpha$. In this case, the fuel injection period Ftoutfi remains unchanged, since it is within a range defined by the fuel injection start timing limit IJLMT.START and the fuel injection end timing limit IJL MT.END.

On the other hand, when the result in S18 is negative, since this indicates that IJ.START.Fi does not exceed IJLMT.START, in other words, it is before the limit, the program skips S20, S22.

The program then proceeds to S24 in which it is determined whether the desired fuel injection end timing IJAFi is less than the fuel injection end timing limit IJLMT.END, in other words, it is determined whether IJAFi exceeds IJLMT.END in the retarded direction in crank angle. Here, IJAFi is the corrected value if corrected and if not, it is the aforesaid basic value determined based on the detected engine speed NE and the engine load (manifold absolute pressure PBA).

When the result is negative, the program is immediately terminated and when the result is affirmative, the program proceeds to S26 in which the desired fuel injection end timing IJAFi is set to the fuel injection end timing limit IJLMT.END, and to S28 in which the fuel injection period Ftoutfi is corrected (in angle-time conversion) using an equation shown there.

Figure 4C:
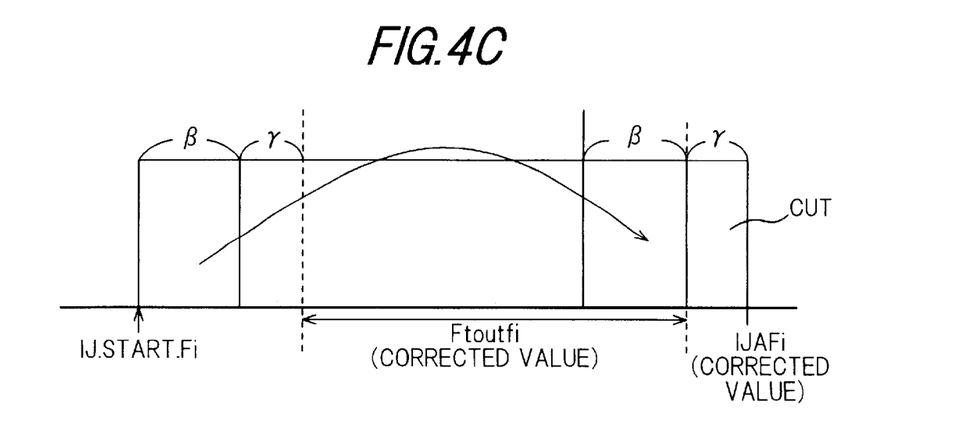

Explaining this with reference to FIG. 4C, suppose that, since the desired fuel injection start timing IJ.START.Fi exceeds the fuel injection start timing limit by $\beta+\gamma$ in the advanced direction, IJ.START.Fi is limited to IJLMT.START (in S20) and IJAFi is corrected by the excess amount ($\beta+\gamma$) in the retarded direction (in S22). Disadvantageously, since the corrected desired fuel injection end timing IJAFi exceeds the fuel injection end timing limit IJLMT.END in the retarded direction, the desired fuel injection end timing IJLAFi is limited to the fuel injection end timing limit IJLMT.END (in S26). At the same time, the fuel injection period Ftoutfi is shortened by cutting off the amount ($\gamma$) exceeding IJ LMT.END such that Ftoutfi is within the range defined by IJLMT.START and IJLMT.END (in S28).

Based on the values thus determined, the fuel injection is controlled in the ECU 80. The fuel injection control will also be conducted when the engine 10 is operated at the ultra-lean burn combustion.

Having been configured in the fore going manner, the system according to the embodiment can ensure the engine torque drop is kept to a minimum extent, while surely avoiding smoke to occur.

The embodiment is thus configured to have a system for controlling a fuel injection timing for an internal combustion engine (10), including; engine operating condition detecting means (ECU 80, 62, 66) for detecting operating conditions of the engine at least including an engine speed (NE) and an engine load (PBA); fuel injection amount determining means (ECU 80) for determining a fuel injection amount (Ftoutfi, TOUT) based at least on the detected engine speed (NE) and the engine load (PBA) of the engine operating conditions; desired fuel injection start timing determining means (ECU 80, S16) for determining a desired fuel injection start timing (IJ.START.Fi) at which injection of the determined fuel injection amount should be started; and fuel injecting means (ECU 80, S30) for injecting the determined fuel injection amount based on the determined fuel injection start timing. In the system, the engine (10) is a direct injection spark ignition engine which is operated at an ultra-lean bum combustion or at a pre-mixture charged combustion; and the system includes: fuel injection start timing limit determining means (ECU 80, S10) for determining a fuel injection start timing limit (IJLMT.START) by which injection of the determined fuel injection amount should be started based at least on the detected engine speed (NE) in accordance with predetermined data so as to avoid smoke from occurring in the engine; and fuel injection timing comparing means (ECU 80, S18) for comparing the desired fuel injection start timing (IJ.START.Fi) with the fuel injection start timing limit (IJ LMT.START); and fuel injection start timing correcting means (ECU 80, S20, S22) for correcting at least one of the desired fuel injection start timing (IJ.START.Fi) and the fuel injection amount (Ftoutfi), when the desired fuel injection start timing is found to exceed the fuel injection start timing limit in advanced direction in crank angle, such that the fuel injection is started by the fuel injection timing limit.

The system further includes; desired fuel injection end timing determining means (ECU 80, S16) for determining a desired fuel injection end timing (IJAFi) at which injection of the determined fuel injection amount should be ended; fuel injection end timing limit determining means (ECU 80, S12) for determining a fuel injection end timing limit (IJLMT.END) by which injection of the determined fuel injection amount should be ended based at least on the detected engine speed (NE) in accordance with predetermined data so as to avoid smoke from occurring in the engine; and fuel injection timing comparing means (ECU 80, S24) for comparing the desired fuel injection end timing (IJAFi) with the fuel injection end timing limit (IJLMT.END); and fuel injection end timing correcting means (ECU 80, S26, S28) for correcting at least one of the desired fuel injection end timing (IJAFi) and the fuel injection amount (Ftoutfi), when the desired fuel injection end timing is found to exceed the fuel injection end timing limit in retarded direction in crank angle, such that the fuel injection is ended by the fuel injection end timing limit.

The system further includes: combustion determining means (ECU 80, S14) for determining whether the engine is operated at pre-mixture charged combustion; and the fuel injection start timing correcting means corrects at least one of the desired fuel injection start timing and the fuel injection amount when the engine is determined to be operated at pre-mixture charged combustion.

In the system, the fuel injection start timing correcting means corrects only the desired fuel injection start timing when the injection of the fuel injection amount can be ended by the fuel injection end timing limit.

In the system, the fuel injection start timing correcting means corrects the desired fuel injection start timing when the injection of the fuel injection amount can be ended by the fuel injection end timing limit and corrects the fuel injection amount by an amount (γ) exceeding the fuel injection end timing limit in the retarded direction in crank angle, such that the fuel injection is ended by the fuel injection end timing limit.

In the system, the fuel injection amount (TOUT) is determined to be a value (Ftoutfi) relating to crank angles.

In the above, "at least" means that any other parameter(s) may instead be used.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling a fuel injection timing for a direct injection spark ignition internal combustion engine which is operated at an ultra-lean burn combustion or at a pre-mixture charged combustion, comprising:

engine operating condition detecting means for detecting operating conditions of the engine at least including an engine speed and an engine load;

fuel injection amount determining means for determining a fuel injection amount based at least on the detected engine speed and the engine load of the engine operating conditions;

desired fuel injection start timing determining means for determining a desired fuel injection start timing at which injection of the determined fuel injection amount should be started based at least on the detected engine speed and the engine load;

fuel injection start timing limit determining means for determining a fuel injection start timing limit by which injection of the determined fuel injection amount should be started based at least on the detected engine speed in accordance with predetermined data so as to avoid smoke from occurring in the engine;

fuel injection timing comparing means for comparing the desired fuel injection start timing with the fuel injection start timing limit;

fuel injection starting timing correcting means for correcting at least one of the desired fuel injection start timing and the fuel injection amount, when the desired fuel injection start timing is found to exceed the fuel injection start timing limit in an advanced direction in crank angle, such that the fuel injection is started by the fuel injection timing limit; and fuel injecting means for injecting the determined fuel injection amount based on the determined fuel injection start timing.

2. A system according to claim 1, further including;

desired fuel injection end timing determining means for determining a desired fuel injection end timing at which injection of the determined fuel injection amount should be ended;

fuel injection end timing limit determining means for determining a fuel injection end timing limit by which injection of the determined fuel injection amount should be ended based at least on the detected engine speed in accordance with predetermined data so as to avoid smoke from occurring in the engine;

fuel injection timing comparing means for comparing the desired fuel injection end timing with the fuel injection end timing limit; and fuel injection end timing correcting means for correcting at least one of the desired fuel injection end timing and the fuel injection amount, when the desired fuel injection end timing is found to exceed the fuel injection end timing limit in a retarded direction in crank angle, such that the fuel injection is ended by the fuel injection end timing limit.

3. A system according to claim 1, further including:

combustion determining means for determining whether the engine is operated at pre-mixture charged combustion; and the fuel injection start timing correcting means corrects at least one of the desired fuel injection start timing and the fuel injection amount when the engine is determined to be operated at pre-mixture charged combustion.

4. A system according to claim 2, further including:

combustion determining means for determining whether the engine is operated at pre-mixture charged combustion; and the fuel injection end timing correcting means corrects at least one of the desired fuel injection end timing and the fuel injection amount when the engine is determined to be operated at pre-mixture charged combustion.

5. A system according to claim 2, wherein the fuel injection start timing correcting means corrects only the desired fuel injection start timing when the injection of the fuel injection amount can be ended by the fuel injection end timing limit.

6. A system according to claim 2, wherein the fuel injection start timing correcting means corrects the desired fuel injection start timing when the injection of the fuel injection amount can be ended by the fuel injection end timing limit and corrects the fuel injection amount by an amount exceeding the fuel injection end timing limit in the retarded direction in crank angle, such that the fuel injection is ended by the fuel injection end timing limit.

7. A system according to claim 1, wherein the fuel injection amount is determined to be a value relating to crank angles.

8. A system for controlling a fuel injection timing for a direct injection spark ignition internal combustion engine which is operated at an ultra-lean burn combustion or at a pre-mixture charged combustion, comprising;

engine operating condition detecting means for detecting operating conditions of the engine at least including an engine speed and an engine load;

fuel injection amount determining means for determining a fuel injection amount based at least on the detected engine speed and the engine load of the engine operating conditions;

desired fuel injection timing determining means for determining a desired fuel injection start timing at which injection of the determined fuel injection amount should be started and a desired fuel injection end timing at which injection of the determined fuel injection amount should be ended, based at least on the detected engine speed and the engine load;

fuel injection timing limit determining means for determining a fuel injection start timing limit by which injection of the determined fuel injection amount should be started and a fuel injection end timing limit by which injection of the determined fuel injection amount should be ended, based at least on the detected engine speed in accordance with predetermined data so as to avoid smoke from occurring in the engine;

fuel injection timing comparing means for comparing the desired fuel injection timings with the fuel injection timing limits;

fuel injection timing correcting means for correcting at least one of the desired fuel injection start timing and the desired fuel injection end timing when the desired fuel injection start timing is found to exceed the fuel injection start timing limit in advanced direction in crank angle, and for correcting at least one of the desired fuel injection end timing and the fuel injection amount when the desired fuel injection end timing is found to exceed the fuel injection end timing limit in a retarded direction in crank angle, such that injection of the fuel injection amount is conducted within a range defined by the fuel injection start timing limit and the fuel injection end timing limit; and fuel injecting means for injecting the determined fuel injection amount based on the determined fuel injection start timing.

9. A system according to claim 8, further including:

combustion determining means for determining whether the engine is operated at pre-mixture charged combustion; and the fuel injection timing correcting means corrects at least one of the desired fuel injection start timing and the fuel injection amount when the engine is determined to be operated at pre-mixture charged combustion.

10. A system according to claim 8, further including:

combustion determining means for determining whether the engine is operated at pre-mixture charged combustion; and the fuel injection timing correcting means corrects at least one of the desired fuel injection end timing and the fuel injection amount when the engine is determined to be operated at pre-mixture charged combustion.

11. A system according to claim 8, wherein the fuel injection timing correcting means corrects only the desired fuel injection start timing when the injection of the fuel injection amount can be ended by the fuel injection end timing limit.

12. A system according to claim 8, wherein the fuel injection timing correcting means corrects the desired fuel injection start timing when the injection of the fuel injection amount can be ended by the fuel injection end timing limit and corrects the fuel injection amount by an amount exceeding the fuel injection end timing limit in the retarded direction in crank angle, such that the fuel injection is ended by the fuel injection end timing limit.

13. A system according to claim 8, wherein the fuel injection amount is determined to be a value relating to crank angles.

14. A method controlling a fuel injection timing for a direct injection spark ignition internal combustion engine which is operated at an ultra-lean burn combustion or at a pre-mixture charged combustion, comprising the steps of:

detecting operating conditions of the engine at least including an engine speed and an engine load;

determining a fuel injection amount based at least on the detected engine speed and the engine load of the engine operating conditions;

determining a desired fuel injection start timing at which injection of the determined fuel injection amount should be started based at least on the detected engine speed and the engine load;

determining a fuel injection start timing limit by which injection of the determined fuel injection amount should be started based at least on the detected engine speed in accordance with predetermined data so as to avoid smoke from occurring in the engine;

comparing the desired fuel injection start timing with the fuel injection start timing limit;

correcting at least one of the desired fuel injection start timing and the fuel injection amount, when the desired fuel injection start timing is found to exceed the fuel injection start timing limit in an advanced direction in crank angle, such that the fuel injection is started by the fuel injection timing limit; and injecting the determined fuel injection amount based on the determined fuel injection start timing.

15. A method according to claim 14, further including the steps of;

determining a desired fuel injection end timing at which injection of the determined fuel injection amount should be ended;

determining a fuel injection end timing limit by which injection of the determined fuel injection amount should be ended based at least on the detected engine speed in accordance with predetermined data so as to avoid smoke from occurring in the engine;

comparing the desired fuel injection end timing with the fuel injection end timing limit; and correcting at least one of the desired fuel injection end timing and the fuel injection amount, when the desired fuel injection end timing is found to exceed the fuel injection end timing limit in a retarded direction in crank angle, such that the fuel injection is ended by the fuel injection end timing limit.

16. A method according to claim 14, further including the step of:

determining whether the engine is operated at pre-mixture charged combustion; and the step of fuel injection start timing correcting corrects at least one of the desired fuel injection start timing and the fuel injection amount when the engine is determined to be operated at pre-mixture charged combustion.

17. A method according to claim 15, further including:

determining whether the engine is operated at pre-mixture charged combustion; and the step of fuel injection end timing correcting corrects at least one of the desired fuel injection end timing and the fuel injection amount when the engine is determined to be operated at pre-mixture charged combustion.

18. A method according to claim 15, wherein the step of fuel injection start timing correcting, corrects only the desired fuel injection start timing when the injection of the fuel injection amount can be ended by the fuel injection end timing limit.

19. A method according to claim 15, wherein the step of fuel injection start timing correcting, corrects the desired fuel injection start timing when the injection of the fuel injection amount can be ended by the fuel injection end timing limit and corrects the fuel injection amount by an amount exceeding the fuel injection end timing limit in the retarded direction in crank angle, such that the fuel injection is ended by the fuel injection end timing limit.

20. A method according to claim 14, wherein the fuel injection amount is determined to be a value relating to crank angles.

21. A method of controlling a fuel injection timing for a direct injection spark ignition internal combustion engine which is operated at an ultra-lean burn combustion or at a pre-mixture charged combustion, comprising the steps of;

detecting operating conditions of the engine at least including an engine speed and an engine load;

determining a fuel injection amount based at least on the detected engine speed and the engine load of the engine operating conditions;

determining a desired fuel injection start timing at which injection of the determined fuel injection amount should be started and a desired fuel injection end timing at which injection of the determined fuel injection amount should be ended, based at least on the detected engine speed and the engine load;

determining a fuel injection start timing limit by which injection of the determined fuel injection amount should be started and a fuel injection end timing limit by which injection of the determined fuel injection amount should be ended, based at least on the detected engine speed in accordance with predetermined data so as to avoid smoke from occurring in the engine;

comparing the desired fuel injection timings with the fuel injection timing limits;

correcting at least one of the desired fuel injection start timing and the desired fuel injection end timing when the desired fuel injection start timing is found to exceed the fuel injection start timing limit in an advanced direction in crank angle, and for correcting at least one of the desired fuel injection end timing and the fuel injection amount when the desired fuel injection end timing is found to exceed the fuel injection end timing limit in a retarded direction in crank angle, such that injection of the fuel injection amount is conducted within a range defined by the fuel injection start timing limit and the fuel injection end timing limit; and injecting the determined fuel injection amount based on the determined fuel injection start timing.

22. A method according to claim 21, further including the step of:

determining whether the engine is operated at pre-mixture charged combustion; and the step of fuel injection timing correcting, correcting at least one of the desired fuel injection start timing and the fuel injection amount when the engine is determined to be operated at pre-mixture charged combustion.

23. A method according to claim 21, further including the step of:

determining whether the engine is operated at pre-mixture charged combustion; and the step of fuel injection timing correcting corrects at least one of the desired fuel injection end timing and the fuel injection amount when the engine is determined to be operated at pre-mixture charged combustion.

24. A method according to claim 21, wherein the step of fuel injection timing correcting, corrects only the desired fuel injection start timing when the injection of the fuel injection amount can be ended by the fuel injection end timing limit.

25. A method according to claim 21, wherein the step of fuel injection timing correcting, corrects the desired fuel injection start timing when the injection of the fuel injection amount can be ended by the fuel injection end timing limit and corrects the fuel injection amount by an amount exceeding the fuel injection end timing limit in the retarded direction in crank angle, such that the fuel injection is ended by the fuel injection end timing limit.

26. A method according to claim 21, wherein the fuel injection amount is determined to be a value relating to crank angles.

* * * * *